US011236691B2

(12) United States Patent
Min et al.

(10) Patent No.: US 11,236,691 B2
(45) Date of Patent: Feb. 1, 2022

(54) METHOD OF PREDICTING OCCURRENCE OF ENGINE KNOCKING

(71) Applicant: SEOUL NATIONAL UNIVERSITY R&DB FOUNDATION, Seoul (KR)

(72) Inventors: Kyoung Doug Min, Seoul (KR); Chi Heon Song, Gyeonggi-do (KR); Seok Won Cho, Seoul (KR); Young Bok Lee, Seoul (KR); Ji Hwan Park, Gyeonggi-do (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/348,168

(22) Filed: Jun. 15, 2021

(65) Prior Publication Data

US 2021/0388788 A1    Dec. 16, 2021

(30) Foreign Application Priority Data

Apr. 16, 2020 (KR) ........................ 10-2020-0046297

(51) Int. Cl.
*G01L 23/22* (2006.01)
*F02D 41/14* (2006.01)
(Continued)

(52) U.S. Cl.
CPC ....... *F02D 41/1401* (2013.01); *F02D 35/023* (2013.01); *F02D 35/024* (2013.01);
(Continued)

(58) Field of Classification Search
CPC ................ F02D 35/024; F02D 35/026; F02D 2041/1412; F02D 2200/0406; F02P 5/12; G01L 23/221
(Continued)

(56) References Cited

U.S. PATENT DOCUMENTS 8,677,975 B2 *  3/2014  Auclair ................... F02D 19/12
                                                         123/435
10,961,946 B2 *  3/2021  Shishime .............. F02D 41/405
(Continued)

FOREIGN PATENT DOCUMENTS

JP     2019-127829      8/2019
KR  10-2004-0074917     8/2004
(Continued)

OTHER PUBLICATIONS

Cho, S. et al., Development of Knock Prediction Model for Onboard Control in a Spark-Ignited Engine, presented Jun. 12, 2019 at SIA Paris 2019, Power Train & Electronics, International Conference and Exhibition, held at Les Pyramides, Port-Marly, France.
(Continued)

*Primary Examiner* — Erick R Solis
(74) *Attorney, Agent, or Firm* — Wenderoth, Lind & Ponack, L.L.P.

(57) ABSTRACT

Disclosed herein is a method of predicting engine knocking, which includes calculating initial pressure in cylinder based on operating data and pressure in intake manifold measured using manifold absolute pressure sensor, calculating pressure at spark timing in the cylinder by interpreting compression process as polytropic process based on the calculated initial pressure in the cylinder, calculating heat release rate for individual operating conditions based on the calculated pressure in the cylinder at spark timing, calculating pressure change in the cylinder based on the calculated heat release rate, calculating unburned gas temperature in adiabatic compression process based on the calculated pressure change in the cylinder, and determining whether knock occurs by calculating ignition delay based on the calculated unburned gas temperature and calculating unburned gas mass fraction at crank angle at the end of the ignition delay.

11 Claims, 5 Drawing Sheets

(51) Int. Cl.
  *F02D 35/02* (2006.01)
  *F02D 41/00* (2006.01)
  *F02P 5/12* (2006.01)

(52) U.S. Cl.
  CPC ......... *F02D 35/025* (2013.01); *F02D 35/026* (2013.01); *F02D 41/009* (2013.01); *F02P 5/12* (2013.01); *G01L 23/221* (2013.01); *F02D 2041/1412* (2013.01); *F02D 2200/0406* (2013.01); *F02D 2200/101* (2013.01)

(58) Field of Classification Search
  USPC ............ 123/406.37, 406.41, 406.42, 406.43; 701/111; 73/114.02
  See application file for complete search history.

(56) References Cited

U.S. PATENT DOCUMENTS

2003/0188714 A1  10/2003  Yamamoto et al.
2017/0226956 A1*  8/2017  Suzuki .................... F02D 41/30
2018/0045126 A1*  2/2018  He ........................ F02D 11/105

FOREIGN PATENT DOCUMENTS

KR  10-2005-0006754  1/2005
KR  10-1807056  12/2017

OTHER PUBLICATIONS

Office Action dated Apr. 20, 2021 in Korean Patent Application No. 10-2020-0046297, with English-language translation.

Song, Hwasup, "Development of Knock Prediction Model by Cool Flame Elimination Method Covering NTC Region: Modeling and Experimental Study", Dissertation, Seoul National University, Jul. 13, 2017, pp. 1-137.

Cho, Seokwon et al., "Prediction Modeling and Analysis of Knocking Combustion using an Improved 0D RGF Model and Supervised Deep Learning", Energies, 2019, vol. 12, No. 844, pp. 1-25.

* cited by examiner

METHOD OF PREDICTING OCCURRENCE OF ENGINE KNOCKING

RELATED APPLICATIONS

The present application is based on, and claims priority from, Korean Patent Application Number (10-2020-0046297), filed on Apr. 16, 2020, the disclosure of which is hereby incorporated by reference herein in its entirety.

BACKGROUND

1. Technical Field

The present disclosure relates to a method of predicting engine knock(or knocking) phenomenon that occurs during vehicle operation.

2. Related Art

Knock means that mixture of gasoline and air is ignited by flame in engine cylinder to spread the flame to unburned mixture, in which time the unburned mixture spontaneously autoignites due to the rapid increase in pressure and temperature thereof. Knock may cause a rapid decrease in engine power, as well as engine overheating, failure of exhaust valves or pistons, melting problem of pistons and cylinders.

In addition, knocking combustion during driving a vehicle may cause noise to be transmitted to the vehicle cabin through the chassis, which cause driver's inconvenience, and cause damage to the engine, thereby impairing the engine durability.

An engine management system (EMS) uses a knock sensor to avoid knock at the present day. However, the knock sensor detects vibration after knock occurs, and may not completely suppress engine block noise and damage caused by the knock.

The engine management system may impair the quietness and fuel efficiency of vehicle operation by rapidly changing operating parameters to avoid knocking combustion when the knock is detected.

Therefore, there is a need for a means that capable of predicting and preventing the knock occurrence in order to robustly control engine operating parameters during vehicle operation.

SUMMARY

Various embodiments are directed to a method of predicting pressure of engine according to the operating condition of the engine and of predicting knock occurrence in the engine using the predicted pressure.

In accordance with an aspect of the present disclosure, there is provided a method of predicting occurrence of engine knock, which includes calculating initial pressure in cylinder based on operating parameters and pressure in intake manifold measured using an absolute manifold pressure (MAP) sensor, calculating in-cylinder pressure at spark timing by interpreting compression process as polytropic process based on the initial pressure calculation, calculating heat release rate for individual operating conditions based on the calculated in-cylinder pressure at spark timing and a normalized burn rate, calculating pressure change in the cylinder based on the calculated burn rate for individual operating conditions, calculating unburned gas temperature using adiabatic compression process using the calculated change in in-cylinder pressure, and determining whether knock occurs by calculating ignition delay based on the calculated unburned gas temperature and calculating mass fraction of the unburned gas at the end of the ignition delay.

In the calculating initial pressure in cylinder, the operating data may include engine speed, intake and exhaust valve lifts, and valve timings, and the initial pressure in the cylinder may be calculated by the following Equation 1:

$$P_{Cyl,IVC} = P_{Mani,IVC} + C_1 + C_2 Speed + C_3 OF \quad \text{[Equation 1]}$$

where $P_{Cyl,IVC}$: estimated initial pressure in the cylinder (when intake valves are closed), $P_{Mani,IVC}$: pressure in the intake manifold (when the intake valves are closed), Speed: engine speed, OF: valve overlap factor, $C_1$, $C_2$, $C_3$: constants, $D_{In}$: intake valve diameter (diameter), $D_{Ex}$: exhaust valve diameter (diameter), $L_{In}$: intake valve lift (length), $L_{Ex}$: exhaust valve lift (length), $\theta_{IVO}$: timing at intake valve opening (angle), $\theta_{EVC}$: timing at exhaust valve closing (angle), and Vd: engine displacement (volume per cylinder).

The method may further include calculating initial temperature in the cylinder by following Equation 2, based on the estimated initial pressure in the cylinder and fuel input amount in an engine:

$$T_{IVC} = \frac{P_{IVC} V_{IVC}}{m \overline{R}} \quad \text{[Equation 2]}$$

where $T_{IVC}$: initial temperature in the cylinder (when intake valves are closed), $P_{IVC}$: initial pressure in the cylinder (when intake valves are closed), $V_{IVC}$: cylinder volume (when the intake valves are closed), m: mass of mixture (fuel with air), and $\overline{R}$: the gas constant.

The polytropic process may be based on the following Equation 3, and the polytropic index k may be calculated based on initial specific heat ratio, compression ratio, and engine speed:

$$P_1 V_1^k = P_2 V_2^k \quad \text{[Equation 3]}$$
$$k = C_1 (CR)^{-C_2} (v_{IVC})^{C_3} (Speed)^{C_4}$$

where $P_1$, $P_2$: pressure in the cylinder, $V_1$, $V_2$: cylinder volume, k: polytropic index, $C_1$, $C_2$, $C_3$, $C_4$: constants, R: gas constant, $\gamma_{IVC}$: specific heat ratio estimated from the amount of fuel and air, and Speed: engine speed.

The calculation of heat release rate for individual operating conditions may be performed by the following Equation 4:

$$\text{HEAT RELEASE RATE} = (\text{FUEL HEAT ENERGY} - \text{HEAT LOSS}) \quad \text{[Equation 4]}$$
$$\left(1 - \text{EXP}\left[-a\left(\frac{\theta - \text{SPARK TIMING}}{\text{COMBUSTION DURATION}}\right)^{m+1}\right]\right)$$

-continued $$\text{HEAT LOSS} = C_1(\text{AMOUNT OF FUEL})^{C_2}(Speed)^{-C_3}(\text{SPARK TIMING})^{-C_4}$$

$$\text{COMBUSTION DURATION} = C_1 \rho^{-C_2}\left(1 - \frac{C_3}{\sqrt{\text{ENGINE SPEED}}}\right)$$

$$(C_4(\text{SPARK TIMING})^2 - C_5(\text{SPARK TIMING}) + 1)$$

where a: constant, θ: crank angle, $C_1$ to $C_5$: constants, ρ: density of mixture, and m: constant.

The calculation of pressure change in the cylinder based on the estimated heat release rate for individual operating conditions may be performed by the following Equation 5:

$$P_n = \frac{\frac{dQ_{net}}{d\theta} - \frac{\gamma}{\gamma-1}P_{n-1}\frac{dV}{d\theta}}{\frac{1}{\gamma-1}V_{n-1}\frac{1}{d\theta}} + P_{n-1} \qquad [\text{Equation 5}]$$

where $P_n$, $P_{n-1}$: pressure, $Q_{net}$: net heat release amount, $V_{n-1}$: volume, and γ: specific heat ratio.

The calculation ignition delay based on the calculated unburned gas temperature may be performed by the following Equation 6:

$$\text{IGNITION DELAY} = C_1\left(\frac{P}{T}\right)^{-C_2}\text{EXP}\left(\frac{C_3}{T}\right) \qquad [\text{Equation 6}]$$

where P: pressure, T: temperature, and $C_1$, $C_2$, $C_3$: constants.

The calculation of unburned gas mass fraction at a crank angle at the end of the ignition delay may be performed by the following Equation 7:

$$\text{UNBURNED MASS FRACTION} = \qquad [\text{Equation 7}]$$
$$\text{EXP}\left[-a\left(\frac{\theta_{AUTOIGNITION} - \text{SPARK TIMING}}{\text{COMBUSTION DURATION}}\right)^{m+1}\right]$$

where a: constant, $\theta_{autoignition}$: angle, and m: constant.

The determining whether knock occurs may be performed by comparing a threshold value of the unburned gas mass fraction at the end of the ignition delay with a threshold value of the unburned gas mass fraction at the time of the knock occurrence.

If the threshold value of the unburned gas mass fraction at the crank angle at the end of the ignition delay is equal to or greater than the threshold value of the unburned gas mass fraction at the time of the knock, the current operating condition may be determined as a knock occurrence condition.

In accordance with another aspect of the present disclosure, there is provided an engine management system for predicting occurrence of engine knock, which includes a memory to store an engine management program therein, and a processor for executing the engine management program stored in the memory. The processor is configured to, according to the execution of the program, cause initial pressure in cylinder to be calculated based on operating data and pressure in intake manifold measured using manifold absolute pressure sensor, pressure at spark timing in the cylinder to be calculated by interpreting compression process as polytropic process based on the calculated initial pressure in the cylinder, heat release rate for individual operating conditions to be calculated based on the calculated pressure at spark timing in the cylinder and normalized heat release rate, pressure change in the cylinder to be calculated based on the calculated heat release rate for individual operating conditions, unburned gas temperature in adiabatic compression process to be calculated based on the calculated pressure change in the cylinder, and whether knock occurs to be determined by calculating ignition delay based on the calculated unburned gas temperature and calculating unburned gas mass fraction at crank angle at the end of the ignition delay.

DETAILED DESCRIPTION

Figure 1:
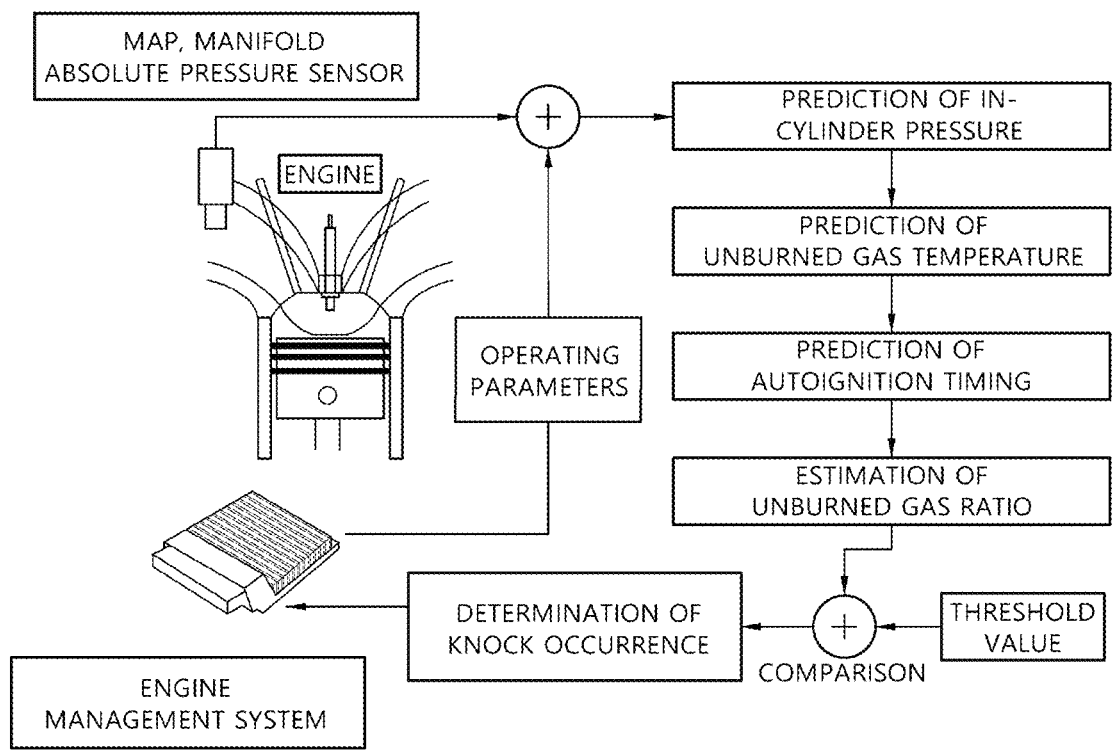
FIG. 1 is a schematic diagram illustrating a method of predicting engine knocking according to an embodiment of the present disclosure.

Reference will now be made in detail to exemplary embodiments of the present disclosure, examples of which are illustrated in the accompanying drawings. The present disclosure may, however, be embodied in different forms and should not be construed as limited to the embodiments set forth herein. In order to clearly illustrate the disclosure in the drawings, parts irrelevant to the description may be omitted in the drawings, and like reference numerals refer to like elements throughout the specification.

In the whole specification, it will be understood that when an element is referred to as being "connected" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

Hereinafter, a method of predicting engine knocking according to an embodiment of the present disclosure will be described in detail.

The method of predicting engine knocking according to the embodiment of the present disclosure is to predict change in pressure in a cylinder due to engine combustion, to estimate the temperature of unburned gas based on the predicted cylinder pressure, and to determine when autoignition occurs under corresponding operating conditions, in order to predict whether knock occurs according to the ratio of unburned gas when the autoignition occurs.

Figure 2:
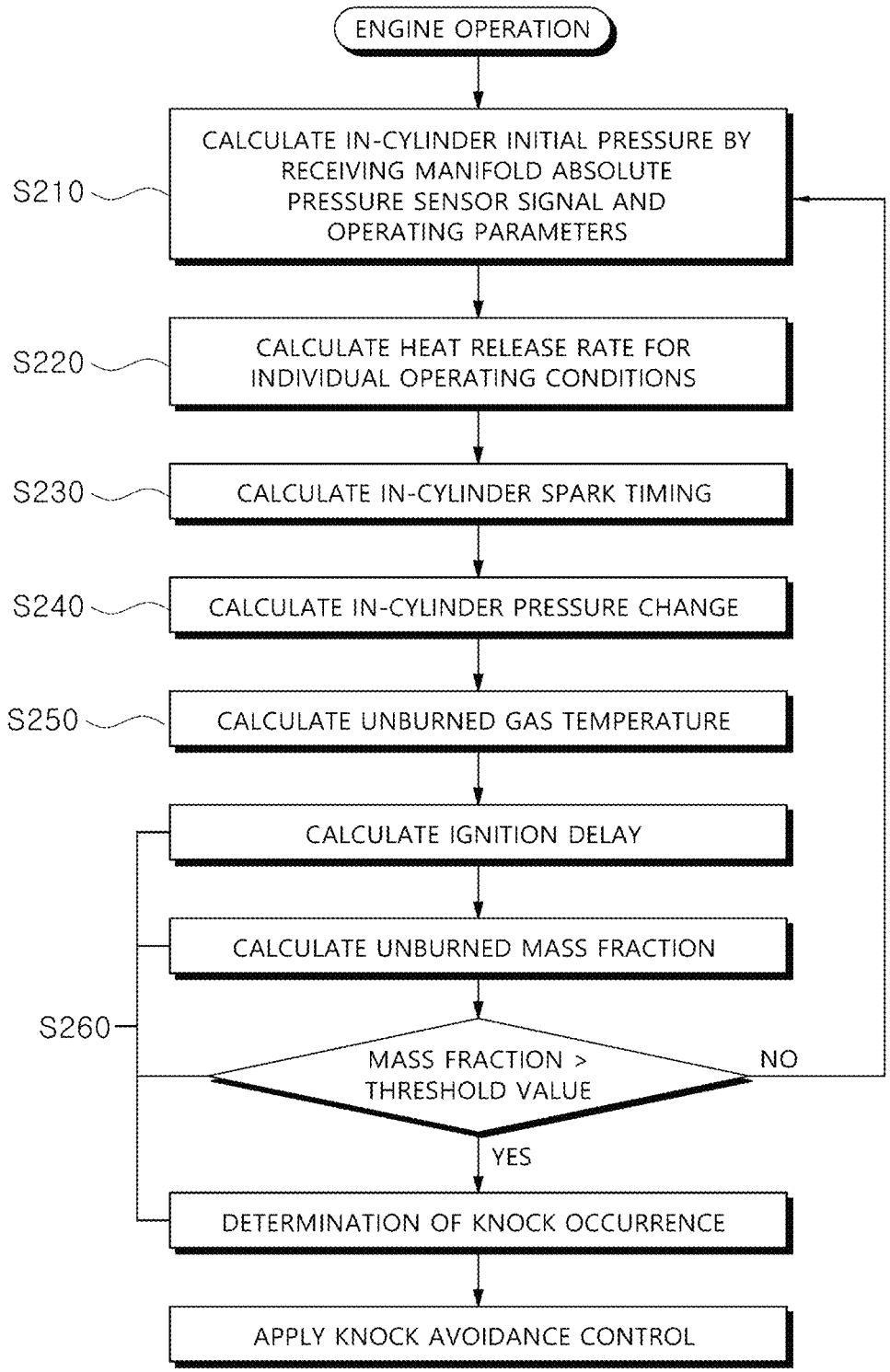
FIG. 2 is a flowchart illustrating the method of predicting engine knocking according to the embodiment of the present disclosure.

FIG. 1 is a schematic diagram illustrating the method of predicting engine knocking according to the embodiment of the present disclosure. FIG. 2 is a flowchart illustrating the method of predicting engine knocking according to the embodiment of the present disclosure.

Referring to FIGS. 1 and 2, the method of predicting engine knocking according to the embodiment of the present disclosure may be performed by the configuration of an engine management system (EMS) and manifold absolute pressure (MAP) sensor disposed on intake manifold of engine.

Here, the manifold absolute pressure sensor is used in a vehicle engine, and is a type of semiconductor pressure sensor. When the piston of the engine moves from top dead center to bottom dead center while the crankshaft of engine rotates, the inlet of an intake manifold through which air is introduced is blocked with a throttle valve so that the intake manifold is under partial vacuum (negative pressure). To transmit the magnitude of such vacuum to the engine management system as an electrical signal (voltage), the manifold absolute pressure sensor is used.

As examples of the manifold absolute pressure sensor, a capacitive type and a piezoresistive type using a diaphragm are used as the electric pressure sensor, and a piezoresistive semiconductor pressure sensor is recently used as the pressure sensor.

The engine management system is a management system used to manage spark timing, variable valve timing, boost level controlled by turbocharger, and other peripheral devices.

Figure 3:
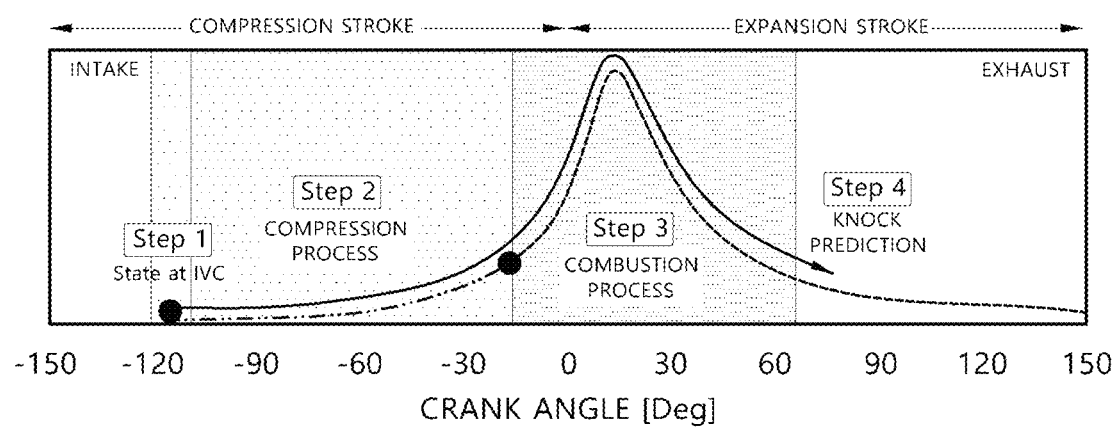
FIG. 3 is a diagram for explaining a process of predicting pressure and autoignition in cylinder according to the embodiment of the present disclosure.

FIG. 3 is a diagram for explaining a process of predicting pressure and autoignition in cylinder according to the embodiment of the present disclosure.

Referring to FIG. 3, the method of predicting engine knocking according to the embodiment of the present disclosure may first perform a step S210 of calculating initial pressure in cylinder based on the operating data and the pressure in intake manifold measured using the manifold absolute pressure sensor. Here, the operating data may include engine speed, intake and exhaust valve lifts, and valve timing.

In the case where the manifold absolute pressure sensor measures the pressure in the intake manifold, the initial pressure in the cylinder when the intake valve is closed may be calculated by the following Equation 1:

$$P_{Cyl,IVC} = P_{Mani,IVC} + C_1 + C_2 Speed + C_3 OF \qquad \text{[Equation 1]}$$

$$OF = \frac{\left( D_{In} \int_{\theta_{IV0}}^{L_{In}=L_{Ex}} L_{In} d\theta + D_{Ex} \int_{L_{In}=L_{Ex}}^{\theta_{EVC}} L_{Ex} d\theta \right)}{V_d}$$

where $P_{Cyl,IVC}$: estimated initial pressure in the cylinder (when the intake valve is closed), $P_{Mani,IVC}$: pressure in the intake manifold (when the intake valves are closed), Speed: engine speed, OF: valve overlap factor, $C_1$, $C_2$, $C_3$: constants, $D_{In}$: intake valve diameter (diameter), $D_{Ex}$: exhaust valve diameter (diameter), $L_{In}$: intake valve lift (length), $L_{Ex}$: exhaust valve lift (length), $\theta_{IVO}$: timing at intake valve opening (angle), $\theta_{EVC}$: timing at exhaust valve closing (angle), and Vd: engine displacement (volume per cylinder).

In other words, the initial pressure in the cylinder may be estimated based on the engine speed, the intake/exhaust valve lift, and the valve timing. In addition, through information on the amount of fuel acquired by the engine management system, and using air/fuel ratio and ideal gas law, it is possible to estimate the temperature in the cylinder when the intake valves are closed.

In other words, based on the amount of fuel in the engine and the initial pressure in the cylinder calculated in step S210, the initial temperature in the cylinder when the intake valves are closed may be calculated by the following Equation 2:

$$T_{IVC} = \frac{P_{IVC} V_{IVC}}{m \bar{R}} \qquad \text{[Equation 2]}$$

where $T_{IVC}$: initial temperature in the cylinder (when intake valves are closed), $P_{IVC}$: initial pressure in the cylinder (when intake valves are closed), $V_{IVC}$: cylinder (when intake valves are closed), m: mass of mixture (fuel with air), and $\bar{R}$: gas constant.

The method may perform, after step S210, step S220 of calculating pressure at spark timing in the cylinder by interpreting the compression process as polytropic process based on the calculated initial pressure in the cylinder.

Here, the polytropic process is based on the following Equation 3, and the polytropic index k may be calculated based on the initial specific heat ratio, the compression ratio, and the engine speed:

$$P_1 V_1^k = P_2 V_2^k \qquad \text{[Equation 3]}$$

$$k = C_1 (CR)^{-C_2} (\gamma_{IVC})^{C_3} (Speed)^{C_4}$$

Where $P_1$, $P_2$: pressure in cylinder, $V_1$, $V_2$: cylinder volume, k: polytropic index, $C_1$, $C_2$, $C_3$, $C_4$: constants, R: gas constant, $\gamma_{IVC}$: specific heat ratio estimated from the amount of fuel and air, CR: compression ratio, and Speed: engine speed.

Figure 4:
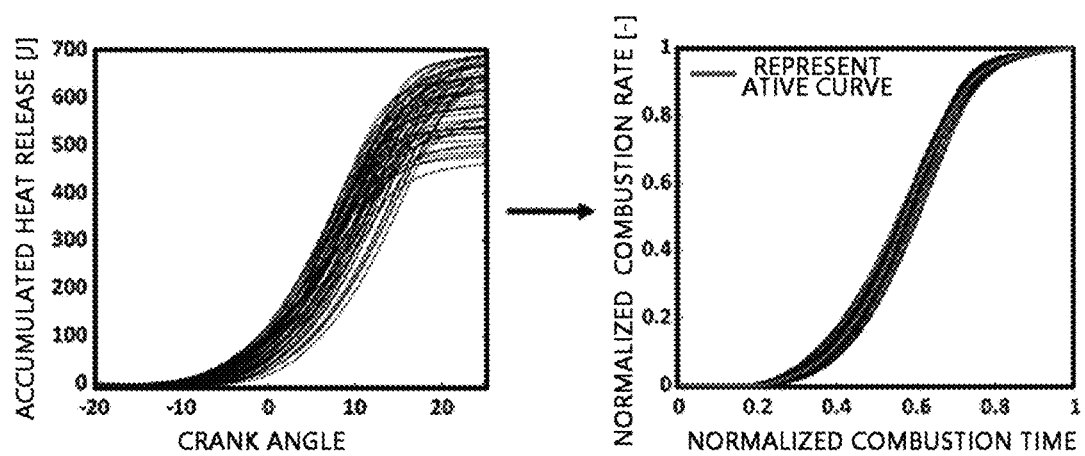
FIG. 4 is a graph for explaining a process of predicting combustion pressure according to the embodiment of the present disclosure.

FIG. 4 is a graph for explaining a process of predicting combustion pressure according to the embodiment of the present disclosure.

Referring to FIG. 4, if the pressure until the spark timing is predicted, the heat release rate for each operating condition may be restored using the normalized heat release rate. That is, the method may perform, after step S230, a step S230 of calculating heat release rate for individual operating conditions based on the calculated spark timing pressure in the cylinder and the normalized heat release rate.

Here, the calculating heat release rate for individual operating conditions may be performed by the following Equation 4:

HEAT RELEASE RATE = (FUEL HEAT ENERGY – HEAT LOSS) [Equation 4]

$$\left(1 - \text{EXP}\left[-a\left(\frac{\theta - \text{SPARK TIMING}}{\text{COMBUSTION DURATION}}\right)^{m+1}\right]\right)$$

HEAT LOSS = $C_1$(AMOUNT OF FUEL)$^{C_2}$(Speed)$^{-C_3}$(SPARK TIMING)$^{-C_4}$ COMBUSTION DURATION = $C_1 \rho^{-C_2}\left(1 - \frac{C_3}{\sqrt{\text{ENGINE SPEED}}}\right)$ $(C_4(\text{SPARK TIMING})^2 - C_5(\text{SPARK TIMING}) + 1)$ where a: constant, θ: crank angle, $C_1$ to $C_5$: constants, ρ: mixture density, and m: constant.

The fuel heat energy may be calculated by multiplying the injected amount of fuel and the heating value, and the spark timing may be obtained from the engine management system. The heat loss and the combustion duration may be estimated using the amount of fuel, the engine speed, and the spark timing.

In this way, the heat release rate may be calculated under specific operating conditions, and the pressure change in the cylinder may be calculated using the heat release rate.

The method may perform, after step S230, step S240 of calculating pressure change in the cylinder based on the calculated heat release rate for individual operating conditions.

The calculating pressure change in the cylinder based on the heat release rate for individual operating conditions may be performed by the following Equation 5:

$$P_n = \frac{\frac{dQ_{net}}{d\theta} - \frac{\gamma}{\gamma-1}P_{n-1}\frac{dV}{d\theta}}{\frac{1}{\gamma-1}V_{n-1}\frac{1}{d\theta}} + P_{n-1} \quad \text{[Equation 5]}$$

where $P_n$, $P_{n-1}$: pressure, $Q_{net}$: net heat release amount, $V_{n-1}$: volume, and γ: specific heat ratio.

The method may perform, after step S240, a step S250 of calculating unburned gas temperature in adiabatic compression process based on the calculated pressure change in the cylinder.

The temperature of the unburned gas may be calculated using the calculated spark timing pressure. For example, the temperature of the unburned gas may be estimated in the adiabatic compression process by the following equation:

$$T_u = T_{IVC}\left(\frac{P_{cyl}}{P_{IVC}}\right)^{1-\frac{1}{\gamma}}$$

where $T_u$: unburned gas temperature, $T_{IVC}$: initial temperature in the cylinder, $P_{cyl}$: pressure in the cylinder, $P_{IVC}$: initial pressure in the cylinder, and γ: specific heat ratio.

The method may perform, after step S250, step S260 of determining whether knock occurs by calculating ignition delay based on the calculated unburned gas temperature and calculating unburned gas mass fraction at crank angle at the end of the ignition delay.

The calculating ignition delay based on the calculated unburned gas temperature may be performed by the following Equation 6:

$$\text{IGNITION DELAY} = C_1\left(\frac{P}{T}\right)^{-C_2}\text{EXP}\left(\frac{C_3}{T}\right) \quad \text{[Equation 6]}$$

where P: pressure, T: temperature, and $C_1$, $C_2$, $C_3$: constants.

The calculating unburned gas mass fraction at crank angle at the end of the ignition delay may be performed by the following Equation 7:

UNBURNED MASS FRACTION = [Equation 7]

$$\text{EXP}\left[-a\left(\frac{\theta_{AUTOIGNITION} - \text{SPARK TIMING}}{\text{COMBUSTION DURATION}}\right)^{m+1}\right]$$

where a: constant, $\theta_{autoignition}$: angle, and m: constant.

Figure 5:
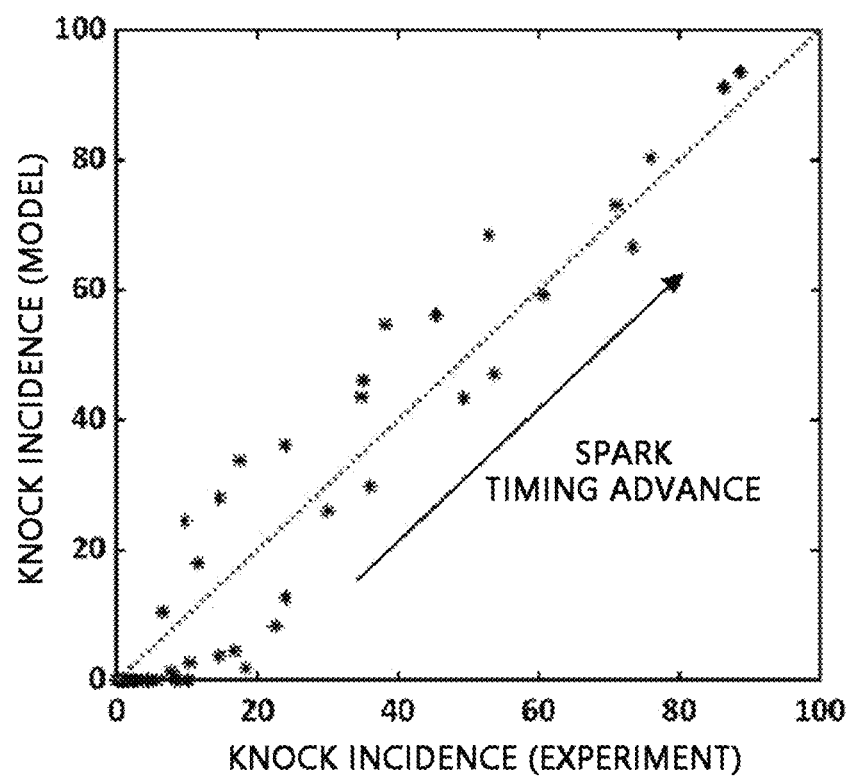
FIG. 5 is a graph for explaining whether knock is predicted according to the embodiment of the present disclosure.

FIG. 5 is a graph for explaining whether knock is predicted according to the embodiment of the present disclosure.

Referring to FIG. 5, it can be seen how accurately a predictive model using the method of predicting engine knocking according to the embodiment of the present disclosure predicts knock compared to actual experiment result. Specifically, when the knock incidence rates through the predictive model and the experimental data are compared with each other, it can be seen that the result value for the knock incidence is similarly derived even if the spark timing is advanced under various operating conditions (*: the experimental value under one operating condition).

In addition, the determining whether knock occurs may be performed by comparing a threshold value of the unburned gas mass fraction at the crank angle at the end of the ignition delay with a threshold value of the unburned gas mass fraction at the time of the knocking. Furthermore, the engine management system may determine the current operating condition as the knocking occurrence condition if the unburned gas mass fraction at the crank angle at the end of the ignition delay is equal to or greater than the threshold value of the unburned gas mass fraction when knock occurs. When the engine management system determines that there is predicted knock occurrence in the current operating condition, it is possible to suppress the knock occurrence in advance through general knock avoidance control.

In the present disclosure, the occurrence of knock can be determined in advance without a actual sensor, unlike the existing method. This can reduce the knock incidence through avoidance control.

The method of predicting engine knocking according to the embodiment of the present disclosure described above may be performed by engine management system. The engine management system includes a memory to store an engine management program therein, and a processor for executing the engine management program stored in the memory. The processor may predict knock occurrence by program execution.

Here, the memory may be a storage medium in which a program for predicting knocking occurrence of engine is stored. The memory may perform a data saving temporarily or permanently processed by the processor. Here, the memory may include a volatile storage medium or a non-volatile storage medium, but the present disclosure is not limited thereto.

Here, the processor may include any type of device capable of processing data. Here, the "processor" may refer to a data processing device embedded in hardware having a physical circuit structure to perform functions represented by, for example, scripts or instructions contained in a program. Examples of the data processing device embedded in hardware may include a microprocessor, a central processing unit (CPU), a processor core, a multiprocessor, and an application-specific integrated circuit (ASIC), and a field programmable gate array (FPGA), but the present disclosure is not limited thereto.

As is apparent from the above description, in the method of predicting engine knocking according to the embodiment of the present disclosure, it is possible to prevent knock from occurring by calculating the probability of knock occurrence in an engine of a vehicle, determining whether the vehicle is in an operating condition where knock is predicted, and changing the operating condition before the knock occurs.

In the method of predicting engine knocking according to the embodiment of the present disclosure, it is possible to reduce engine noise caused by knock and reduce the possibility of damage to the engine. In addition, it is possible to ultimately remove the knock sensor used in current spark-ignition engine, thereby cost reduction of engine production is feasible.

While exemplary embodiments have been described with reference to the accompanying drawings, it is to be understood by those skilled in the art that various modifications and changes in form and details can be made therein without departing from the spirit and scope as defined by the appended claims. Accordingly, the embodiments disclosed herein are intended to illustrate, rather than to limit, the technical ideas of the present disclosure, and it is therefore obvious that the scope of the technical ideas of the present disclosure is not limited by these embodiments. Various modifications and specific embodiments that can be easily inferred by those skilled in the art within the scope of the technical ideas included in the specification and drawings of the present disclosure should be interpreted as falling within the scope of the present disclosure.

What is claimed is:

1. A method of predicting engine knocking by an engine management system, comprising:
   calculating initial pressure in cylinder based on operating data and pressure in intake manifold measured using manifold absolute pressure sensor;
   calculating pressure at spark timing in the cylinder by interpreting compression process as polytropic process based on the calculated initial pressure in the cylinder;
   calculating heat release rate for individual operating conditions based on the calculated spark timing pressure in the cylinder and normalized heat release rate;
   calculating pressure change in the cylinder based on the calculated heat release rate for individual operating conditions;
   calculating unburned gas temperature in adiabatic compression process based on the calculated pressure change in the cylinder; and
   determining whether knock occurs by calculating ignition delay based on the calculated unburned gas temperature and calculating unburned gas mass fraction at crank angle at the end of the ignition delay.

2. The method according to claim 1, wherein in the calculating initial pressure in cylinder, the operating data comprises engine speed, intake and exhaust valve lifts, and valve timing, and the initial pressure in the cylinder is calculated by the following Equation 1:

$$P_{Cyl,IVC} = P_{Mani,IVC} + C_1 + C_2 Speed + C_3 OF \quad \text{[Equation 1]}$$

$$OF = \frac{\left(D_{In} \int_{\theta_{IVO}}^{L_{In}=L_{Ex}} L_{In} d\theta + D_{Ex} \int_{L_{In}=L_{Ex}}^{\theta_{EVC}} L_{Ex} d\theta\right)}{V_d}$$

where $P_{Cyl,IVC}$: estimated initial pressure in the cylinder (when intake valves are closed), $P_{Mani,IVC}$: pressure in the intake manifold (when the intake valves are closed), Speed: engine speed, OF: valve overlap factor, $C_1$, $C_2$, $C_3$: constants, $D_{In}$: intake valve diameter (diameter), $D_{Ex}$: exhaust valve diameter (diameter), $L_{In}$: intake valve lift (length), $L_{Ex}$: exhaust valve lift (length), $\theta_{IVO}$: timing at intake valve opening (angle), $\theta_{EVC}$: timing at exhaust valve closing (angle), and $V_d$: engine displacement (volume per cylinder).

3. The method according to claim 1, further comprising calculating initial temperature in the cylinder by the following Equation 2, based on the calculated initial pressure in the cylinder and amount of fuel in engine:

$$T_{IVC} = \frac{P_{IVC} V_{IVC}}{m\overline{R}} \quad \text{[Equation 2]}$$

where $T_{IVC}$: initial temperature in the cylinder (when intake valves are closed), $P_{IVC}$: initial pressure in the cylinder (when the intake valves are closed), $V_{IVC}$: cylinder volume (when the intake valves are closed), m: mixture amount (fuel with air), and $\overline{R}$: gas constant.

4. The method according to claim 1, wherein the polytropic process is based on the following Equation 3, and polytropic index k is calculated based on initial specific heat ratio, compression ratio, and engine speed:

$$P_1 V_1^k = P_2 V_2^k \quad \text{[Equation 3]}$$

$$k = C_1 (CR)^{-C_2} (\gamma_{IVC})^{C_3} (Speed)^{C_4}$$

where $P_1$, $P_2$: pressure in the cylinder, $V_1$, $V_2$: cylinder volume, k: polytropic index, $C_1$, $C_2$, $C_3$, $C_4$: constants, R: gas constant, $\gamma_{IVC}$: specific heat ratio estimated from the amount of fuel and air, and Speed: engine speed.

5. The method according to claim 1, wherein the calculating heat release rate for individual operating conditions is performed by the following Equation 4:

HEAT RELEASE RATE = (FUEL HEAT ENERGY − HEAT LOSS)     [Equation 4]

$$\left(1 - \mathrm{EXP}\left[-a\left(\frac{\theta - \mathrm{SPARK\ TIMING}}{\mathrm{COMBUSTION\ DURATION}}\right)^{m+1}\right]\right)$$

HEAT LOSS = $C_1$(AMOUNT OF FUEL)$^{C_2}$(Speed)$^{-C_3}$(SPARK TIMING)$^{-C_4}$ $$\mathrm{COMBUSTION\ DURATION} = C_1 \rho^{-C_2}\left(1 - \frac{C_3}{\sqrt{\mathrm{ENGINE\ SPEED}}}\right)$$

$$(C_4(\mathrm{SPARK\ TIMING})^2 - C_5(\mathrm{SPARK\ TIMING}) + 1)$$

where a: constant, θ: crack angle, $C_1$ to $C_5$: constants, ρ: mixture density, and m: constant.

6. The method according to claim 1, wherein the calculating pressure change in the cylinder based on the heat release rate for individual operating conditions is performed by the following Equation 5:

$$P_n = \frac{\frac{dQ_{net}}{d\theta} - \frac{\gamma}{\gamma-1}P_{n-1}\frac{dV}{d\theta}}{\frac{1}{\gamma-1}V_{n-1}\frac{1}{d\theta}} + P_{n-1} \quad [\text{Equation 5}]$$

where $P_n$, $P_{n-1}$: pressure, $Q_{net}$: net heat release amount, $V_{n-1}$: volume, and γ: specific heat ratio.

7. The method according to claim 1, wherein the calculating ignition delay based on the calculated unburned gas temperature is performed by the following Equation 6:

$$\mathrm{IGNITION\ DELAY} = C_1\left(\frac{P}{T}\right)^{-C_2}\mathrm{EXP}\left(\frac{C_3}{T}\right) \quad [\text{Equation 6}]$$

where P: pressure, T: temperature, and $C_1$, $C_2$, $C_3$: constants.

8. The method according to claim 1, wherein the calculating unburned gas mass fraction at crank angle at the end of the ignition delay is performed by the following Equation 7:

UNBURNED MASS FRACTION =     [Equation 7]

$$\mathrm{EXP}\left[-a\left(\frac{\theta_{AUTOIGNITION} - \mathrm{SPARK\ TIMING}}{\mathrm{COMBUSTION\ DURATION}}\right)^{m+1}\right]$$

where a: constant, $\theta_{autoignition}$: angle, and m: constant.

9. The method according to claim 1, wherein the determining whether knock occurs is performed by comparing a threshold value of the unburned gas mass fraction at the crank angle at the end of the ignition delay with a threshold value of the unburned gas mass fraction at the time of the knock.

10. The method according to claim 9, wherein if the threshold value of the unburned gas mass fraction at the crank angle at the end of the ignition delay is equal to or greater than the threshold value of the unburned gas mass fraction at the time of the knock, the current operating condition is determined as a knock occurrence condition.

11. An engine management system for predicting knocking occurrence of engine, comprising:
a memory to store an engine management program therein; and
a processor for executing the engine management program stored in the memory,
wherein the processor is configured to, according to the execution of the program, cause:
initial pressure in cylinder to be calculated based on operating data and pressure in intake manifold measured using manifold absolute pressure sensor;
pressure at spark timing in the cylinder to be calculated by interpreting compression process as polytropic process based on the calculated initial pressure in the cylinder;
heat release rate for individual operating conditions to be calculated based on the calculated spark timing pressure in the cylinder and normalized heat release rate;
pressure change in the cylinder to be calculated based on the calculated heat release rate for individual operating conditions;
unburned gas temperature in adiabatic compression process to be calculated based on the calculated pressure change in the cylinder; and
whether knock occurs to be determined by calculating ignition delay based on the calculated unburned gas temperature and calculating unburned gas mass fraction at crank angle at the end of the ignition delay.

* * * * *